United States Patent [19]

Kikuzawa et al.

[11] Patent Number: 4,623,290
[45] Date of Patent: Nov. 18, 1986

[54] EXTERNALLY THREADED FIBER-REINFORCED PLASTIC MEMBER AND A METHOD OF PRODUCING THE SAME

[75] Inventors: Kenji Kikuzawa; Yukio Otaki, both of Moriyama, Japan

[73] Assignee: Asahi Kasei Kogyo Kabushiki Kaisha, Osaka, Japan

[21] Appl. No.: 584,401

[22] Filed: Feb. 28, 1984

[30] Foreign Application Priority Data

Feb. 28, 1983 [JP] Japan .................................. 58-30877
Jul. 1, 1983 [JP] Japan ................................ 58-119869

[51] Int. Cl.$^4$ ............................................. F16B 21/00
[52] U.S. Cl. ..................................... 411/350; 428/35; 428/224; 428/399; 428/400; 411/417
[58] Field of Search ................. 428/35, 36, 251, 399, 428/400; 411/417, 350

[56] References Cited

U.S. PATENT DOCUMENTS

| | | | |
|---|---|---|---|
| 2,928,764 | 3/1960 | Magoon | 154/83 |
| 2,943,967 | 7/1960 | Simon | 154/83 |
| 3,495,494 | 2/1970 | Scott | 85/1 |
| 4,143,199 | 3/1979 | Bardon et al. | 428/362 |
| 4,355,061 | 10/1982 | Zeigler | 428/36 |

FOREIGN PATENT DOCUMENTS 2212762 9/1973 Fed. Rep. of Germany .
2500375 8/1976 Fed. Rep. of Germany .
2038977 7/1980 United Kingdom .

Primary Examiner—James J. Bell
Attorney, Agent, or Firm—Birch, Stewart, Kolasch & Birch

[57] ABSTRACT

An externally threaded fiber-reinforced plastic member comprising a shank and an integral thread on the exterior surface on the shank, in which a plurality of first strands are arranged substantially in parallel and extending longitudinally of the axis of said shank and a plurality of second strands are arranged substantially in parallel and substantially in perpendicular relation to said first strands has a unique interior structure in which most of the resin-impregnated fiber-filaments existing within the thread extending substantially in a plane including a cross-section of the threaded member are those extending continuously from and laterally of the shank into the thread. Such an externally threaded member having satisfactory mechanical strengths, and can be produced with high productivity and at low cost, utilizing the pultrusion technique, although the production method is not limited thereto.

6 Claims, 5 Drawing Figures

EXTERNALLY THREADED FIBER-REINFORCED PLASTIC MEMBER AND A METHOD OF PRODUCING THE SAME

BACKGROUND OF THE INVENTION

This invention relates to an externally threaded, fiber-reinforced plastic member and a method of producing the same. More particularly, the present invention is concerned with an externally threaded, fiber-reinforced plastic member comprising a shank and an integral thread on the exterior surface on the shank and having a unique interior structure in which most of the resin-impregnated fiber-filaments existing within the thread and extending substantially in a plane including a cross-section of the threaded member are those extending continuously from and laterally of the shank into the thread, and also is concerned with a method producing the same.

Metals or metal alloys such as iron and stainless steel are widely employed as a material for forming threaded members such as bolts and nuts. Metal bolts and nuts are employed as a fastening means in a wide variety of applications including manufacture of playthings and building of large-scale industrial or commercial constructions. However, the use of metal bolts and nuts inevitably encounters serious problems. One of such problems is corrosion. At present, metal bolts and nuts are still often used in corrosive environments. The use of metal bolts and nuts in chemical plants, water or sewage treating plants and the like often leads to fatal dangers. Further, it is noted that metal bolts and nuts are unsuitable for use in marine constructions such as a boat, an artificial reef construction, etc., since they are caused to incessantly come in contact with the sea water, leading to destruction of the constructions. Another important problem resides in electrical and thermal conductivity of the metal bolts and nuts. There are a number of applications where bolts and nuts are required not to be thermally and electrically conductive. Representative examples of such applications are the manufacture of heavy electrical devices or equipment, and construction of electrically-powered transportation devices such as cars for an electrically-powered train, street car, etc. For such applications, metal bolts and nuts must be coated with an insulating material. However, the currently employed insulated metal bolts and nuts are still unsatisfactory.

With respect to corrosion-resistant metals which can be used as a material for bolts and nuts, it is well known that titanium is a metal which is comparatively resistant to corrosion. Further, due to its small specific gravity, titanium is considered to be useful for forming bolts and nuts. However, titanium is not only expensive but also poor in processability. For this reason, the use of titanium-made bolts and nuts are restricted to special fields, for example the aero-space industry. With respect to non-conductive bolts and nuts, there have recently been proposed bolts and nuts made of ceramics due to the rapid progress of the ceramics industry. However, satisfactory ceramic made bolts and nuts have not yet been produced.

In order to cope with the problem of corrosion, bolts and nuts made of a synthetic resin have been proposed. Such resin-made bolts and nuts, however, are very poor in mechanical strength as compared with those made of a metal, and, hence, cannot be an effective substitute for metal bolts and nuts in the application field where a high mechanical strength is required. Therefore, the application of the resin-made bolts and nuts is restricted to a field where the corrosion resistance is strongly required but the mechanical strength is not a matter of importance.

In the field of manufacture of heavy electrical devices or equipment, as a bolt which is required to have excellent mechanical strength and insulating properties, bolts made of fiber-reinforced plastic (hereinafter often abbreviated as "FRP") have been proposed. For example, there has been proposed a FRP made bolt prepared by impregnating a plurality of rovings of about 2000 to about 10000 Tex with a thermohardening resin, drawing the thus obtained resin-impregnated rovings into a mold, curing the resin impregnated rovings in the mold to obtain a rigid rod, and threading the external surface of the rigid rod. This bolt cannot be advantageously used due to such a drawback that since the thread is formed by cutting the external surface of the rod comprising resin-impregnated rovings arranged only longitudinally of the axis of the rod, the rovings left within the thread are fiber filaments cut into extremely short lengths and have no interconnection with the rovings within the shank and, therefore, the thread is poor in mechanical strength and cannot be resistant to the shearing forces imposed thereon.

Figure 1A:
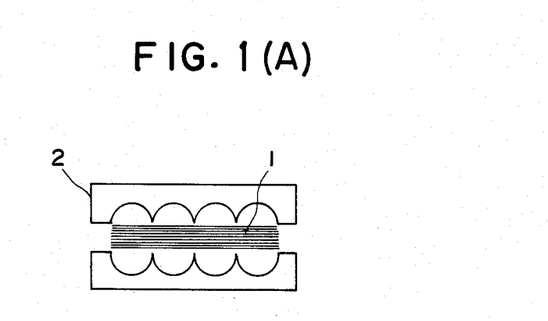
FIG. 1(A) is a vertical cross-sectional diagrammatic view of a split die, with its die halves being separated apart from each other, in which a plurality of prepregs are inserted.
Figure 1B:
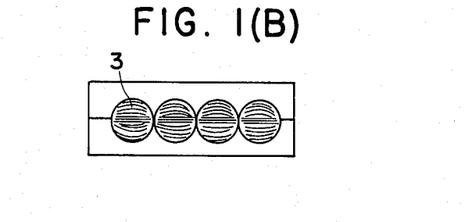
FIG. 1(B) is a vertical cross-sectional diagrammatic view showing the state in which the prepregs shown in FIG. 1(A) are molded into a plurality of rods, illustrating, in combination with FIG. 1(A), the mode of the conventional prepreg-press method.

In order to increase the mechanical strength of the thread of a bolt or the like to a desired level, there has been proposed externally threaded FRP members produced by impregnating with a thermohardening resin, such as an epoxy resin, a yarn cloth made of reinforcing filaments, subjecting the thus obtained resin impregnated yarn cloth to thermohardening in a mold to prepare a rod, and threading the surface of the rod. For example, when an externally threaded FRP member with a diameter larger than about 20 to 25 mm is intended, such a threaded member may be produced by a method comprising impregnating a yarn cloth with a solution of a thermohardening resin in a solvent therefor, heating the above-obtained resin impregnated cloth to remove the solvent, thereby, to obtain a half-cured, substantially non-tacky sheet (hereinafter referred to as "prepreg"), rolling the thus obtained prepreg, heating and pressing the rolled prepreg in a mold to prepare a rigid rod having a circular cross-section, and threading the surface of the rigid rod. On the other hand, when an externally threaded FRP member with a diameter less than about 20 to 25 mm is intended, the threaded member may be produced as follows. According to the so-called prepreg-press method, a predetermined number of the above-mentioned prepregs 1 are piled up as shown in FIG. 1(A) which will be mentioned later, the piled-up prepregs are softened by heating, and the piled-up prepregs are subjected to molding by means of a split die 2 as shown in FIG. 1(B), which will be mentioned later, to prepare a rod 3. The rod thus prepared is subjected, on its peripheral surface, to threading to obtain an FRP made threaded member. As is apparent from the above, both the above-mentioned threaded members are each composed of a thermohardened resin and a yarn cloth comprising a plurality of first strands of fiber filaments arranged substantially in parallel and extending longitudinally of the axis of the shank and a plurality of second strands of fiber filaments arranged substantially in parallel and substantially in perpendicular relation to said first strands. However, in the former, namely, in the externally thread member made of a rolled prepreg, as viewed in a cross-section perpendiacular to the axis of the shank, only one first strand extend from the center of the shank into the thread in a rolled manner and, therefore, the reinforcing effect of the fiber filaments of the strand cannot be attained at the thread portion. On the other hand, in the latter, namely, in the externally threaded member produced by the so-called prepreg-press method, in substantially only both diametrically opposite portions of the externally threaded member corresponding to the boundary portions of the die halves of the split die (see FIG. 1(B)) there concentratedly exist second strands extending continuously from and laterally of the shank into thread. The fiber reinforcing effect of the fiber filaments of the strands at the thread portion has been improved to some extent as compared to that of the above-mentioned threaded member of the rolled prepreg. However, in producing the above-mentioned threaded member, the preparation of prepregs and the molding of the prepregs require troublesome procedures. Therefore, the threaded member thus produced is very expensive so that the production of it needs 3 to 4 times the cost for customary FRP made threaded member.

On the other hand, there has recently been proposed a bolt which is obtained by threading the surface of a rod of dual structure. The rod of dual structure is prepared by impregnating a plurality of glass fiber rovings of about 8000 Tex with a resin, pultruding said plurality of glass fiber rovings through a heated mold to prepare a core rod, winding on the surface of the core rod a chopped strand mat made of 1 to 2 inch cut glass fibers, and subjecting the resulting chopped strand matwound core rod to pultrusion or press-molding to obtain a rod of dual structure. This kind of bolt, however, has such disadvantages that the process for producing the same requires complicated procedures and that the bolt thus produced tends to easily separate between the chopped strand mat layer and the core rod.

SUMMARY OF THE INVENTION

Accordingly, it is earnestly desired in the art to develop an FRP made externally threaded member which is excellent in mechanical strength and can be produced by a simple method at low cost. The present inventors have made extensive and intensive research to develop such an externally threaded member. As a result, the present inventors have found that an FRP made externally threaded member having a mechanical strength comparable or superior to that of the threaded member prepared by the above-mentioned prepreg-press method can be prepared simply by using a plurality of resin-impregnated yarn tapes or yarn cloth slit tapes at low cost. Heretofore, it has not been conceived or has been considered to be impossible to produce a fiber-reinforced plastic rod by drawing a plurality of resin-impregnated wide tapes into a mold. However, the present inventors have unexpectedly and surprisingly succeeded in drawing a plurality of resin-impregnated wide tapes having specific widths into a mold to prepare a fiber-reinforced plastic rod and in producing from said rod an externally threaded fiber-reinforced plastic member comprising a shank and an integral thread on the exterior surface on the shank and having a unique interior structure in which most of the resin-impregnated fiber-filaments existing within the thread and extending substantially in a plane including a cross-section of the threaded member are those extending continuously from and laterally of the shank into the thread. The present invention has been made based on such a novel finding and success.

Therefore, it is an object of the present invention to provide an externally threaded, fiber-reinforced plastic member which is excellent in mechanical strength and electrically non-conductive as well as anti-corrosive.

It is another object of the present invention to provide an externally threaded, fiber-reinforced plastic member of the above kind which can be produced at low cost.

It is further object of the present invention to provide a method of producing an externally threaded, fiber-reinforced plastic member of the character descirbed above, which can be simply, easily conducted, thereby enabling the thread member to be produced with a high productivity.

BRIEF DESCRIPTION OF THE DRAWINGS

The foregoing and other objects, features and advantages of the present invention will be apparent from the following detailed description taken in connection with the accompanying drawings in which.

DETAILED DESCRIPTION OF THE DRAWINGS

In one aspect of the present invention, there is provided an externally threaded fiber-reinforced plastic member comprising a shank and a thread formed integrally therewith on the exterior surface of the shank, the shank and the thread each comprising a plurality of resin-impregnated yarn tapes or resin-impregnated yarn cloth slit tapes extending longitudinally of the axis of the shank, at least some of the tapes each being cut out at its portions corresponding to spaces formed by the ridges of the thread, each resin-impregnated yarn tape or each resin-impregnated yarn cloth slit tape being composed of a thermohardened resin and an elongated woven fabric comprising a plurality of first strands arranged substantially in parallel and extending longitudinally of the axis of the shank and a plurality of second strands arranged substantially in parallel and substantially in perpendicular relation to the first strands, the first strands and the second strands respectively constituting the warps and the wefts of the woven fabric, each strand comprising a plurality of fiber filaments, the elongated woven fabric having a width, as measured between the warps respectively disposed at both outward ends of the widthwise length of the fabric, about 0.2 to about 3 times the maximum diameter of the threaded member, the thread having therewithin portions of the second strands, most of the portions being those strand portions which extend continuously form the shank into the thread and terminate within the thread.

The term "yarn tape" used herein means a fabric of yarns woven in the form of a tape. The term "yarn cloth slit tape" used herein means a tape prepared by cutting a fabric of yarns woven in the form of a cloth into a plurality of tapes. Both the tapes will hereinafter be frequently referred to as "elongated woven fabric".

Figure 2:
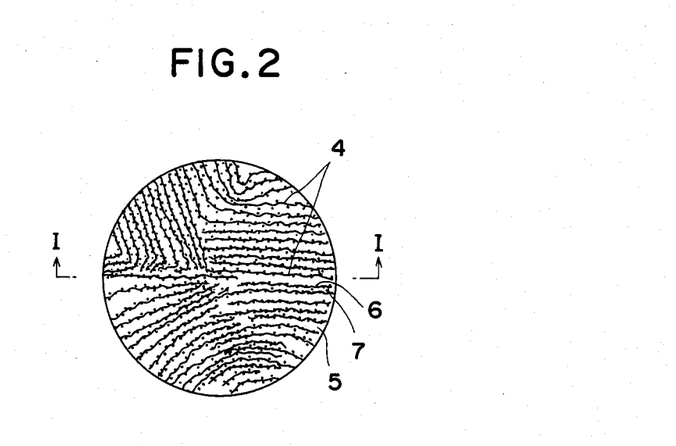
FIG. 2 is a cross-sectional diagrammatic view of one form of an externally threaded member of the present invention.
Figure 3:
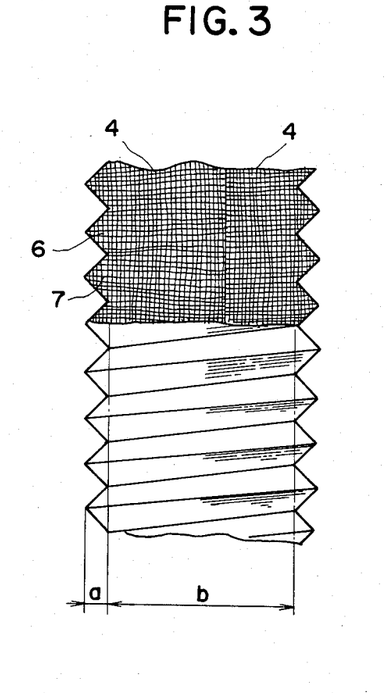
FIG. 3 is a partially cross-sectional view taken along the line I—I in FIG. 2, with the upper and lower parts cut away.

Referring to FIGS. 2 and 3, there are respectively shown a cross-sectional diagrammatic view of one form of an externally threaded member of the present invention, and a partially cross-sectional view taken along the line I—I in FIG. 2, with the upper and lower parts cut away. Numerals 4 and 5 designate an elongated woven fabric and a thermohardened resin, respectively. At least some of the elongated woven fabric are cut out at their portions corresponding to spaces formed by the ridges of the thread, as depicted in FIG. 3. Numerals 6 and 7 respectively designate first strands and second strands. The first strands and second strands respectively constitute the warps and the wefts of the elongated woven fabric. As shown in FIG. 3, the first strands are arranged substantially in parallel and extending longitudinally of the axis of the shank (b) and the second strands are arranged substantially in parallel and substantially in perpendicular relation to the first strands. A thread portion (a) has therewithin portions of the second strands. As shown in FIGS. 2 and 3, most of the portions of the second strands are those strand portions which extend continuously from and laterally of the shank into the thread and terminate within the thread. In a preferred form of the externally threaded fiber-reinforced plastic member of the present invention, the above-mentioned strand portions which extend continuously from the shank into the thread and terminate within the thread exist continuously or discontinuously within the thread along the periphery of the thread at its portions each corresponding to one pitch of the thread, provided that there is no portion within the thread in which said strand portions do not exist continuously over a length of 20% or more based on the peripheral length of the thread at its each portion corresponding to one pitch of the thread. Whether or not there is a portion within the thread in which said strand portions do not exist continuously over a length of 20% or more based on the peripheral length of the thread at its each portion corresponding to one pitch of the thread, may be determined as follow. The externally threaded member is transversely cut along the peripheral line including the apex portion corresponding to a certain pitch of the thread so that the cut section appears. The cut section of the externally threaded member is observed by means of a microscope. The observation of the cut section gives the mode of arrangement of the second strands (wefts). In the cut section, portions of the second strands within the thread portion which extend continuously from the shank portion into the thread portion and terminate within the thread portion cross the imaginary boundary circle between the thread portion and the shank portion. Two mutually adjacent second strands most apart from each other are found.

The two mutually adjacent seconds strands respectively cross the above-mentioned imaginary boundary circle at a point ($\alpha$) and a point ($\beta$). The distance along the imaginary boundary circle between the point ($\alpha$) and the point ($\beta$) is measured in terms of an angle ($\theta°$) defined by the straight line connecting the point ($\alpha$) and the center point (c) of the shank portion and the straight line connecting the point ($\beta$) and the center point (c). By calculating the formula $\theta°/360° \times 100$, whether or not the distance along the imaginary boundary circle between the points ($\alpha$) and ($\beta$) is 20% or more based on the circumference of the imaginary boundary circle can be determined. In this way, whether or not there is a portion within the thread in which said strand portions do not exist continuously over a length of 20% or more based on the peripheral length of the thread at its each portion corresponding to one pitch of the thread, is determined.

The width of each of the elongated woven fabrics is in the range of about 0.2 to about 3 times, preferably 0.2 to 2 times, the maximum diameter of the externally threaded member. The term "width" of the elongated woven fabric used herein means a width as measured between the warps respectively disposed at both outward ends of the widthwise length of the elongated woven fabric. When the width of the elongated woven fabric is out of the above-mentioned range, the physical properties such as tensile strength and the like of the products undesirably vary with a wide distribution. When the elongated woven fabric is a yarn cloth slit tape and the width thereof is less than 0.5 cm, the wefts are loosened and do not function as wefts. Therefore, from the practical view point, the width of each of the elongate woven fabrics of yarn cloth slit tapes is 0.5 cm or more.

In the present invention, as described above, the resin-impregnated yarn tapes or resin-impregnated yarn cloth slit tapes constituting the externally threaded member each are composed of a thermohardened resin and an elongated fabric. Each of the strands of the elongated fabric comprises a plurality of fiber filaments. The kind of fiber filaments is not critical, but from a view point of mechanical strength, there may preferably be employed those fiber filaments which each have a tensile strength of 100 to 550 Kg/mm$^2$ and a modulus in tension of 6000 to 120000 Kg/mm$^2$. As examples of such kinds of fiber filaments, there may be mentioned glass fiber filaments, carbon fiber filaments, aramid fiber filaments, boron fiber filaments and silicon carbide fiber filaments. For example, the glass fiber filament has a modulus in tension of about 7000 to 7500 Kg/mm$^2$ and a tensile strength of about 200 to 350 Kg/mm$^2$, and the carbon fiber filament has a modulus in tension of about 20000 to 120000 Kg/mm$^2$ and a modulus in tension of about 200 to 550 Kg/mm$^2$.

The diameter of each of the fiber filaments constituting the first and second strands and the fineness of each of the first and second strands constituting the elongated woven fabric may be varied according to the mechanical strength required for the externally threaded member. Where an elongated woven fabric made of glass fiber filaments are used, the diameter of each of the glass fiber filaments may be in the range of about 3 to 15$\mu$, preferably 6 to 13$\mu$, and the fineness of each of the first and second strands may be in the range of 2 to 150 Tex, preferably 5 to 13.5 Tex. Where an elongated woven fabric made of carbon fiber filaments are used, the diameter of each of the carbon fiber filaments may be about 5 to 15μ, and the fineness of each of the first and second strands may be in the range of 20 to 200 Tex.

The density of the elongated woven fabric may also be varied according to the mechanical strength required for the externally threaded member, but where an elongate woven fabric made of glass fiber filaments is used, the density, expressed in terms of g/m$^2$, of the elongated woven fabircs may preferably be in the range of 20 g/m$^2$ to 500 g/m$^2$, more preferably 100 to 300 g/m$^2$.

In the present invention, it is desirable that the wefts of the elongated woven fabrics protrude, at least one side edge portion of the elongated fabric, laterally of the outermost warp by a length of about 1 to about 10 mm, preferably about 1 to about 5 mm. This is so because the above-mentioned protruded portions of the wefts of yarn tapes are apt to be entangled in an externally threaded member, thereby increasing the mechanical strength of the thread. However, if the length of the protruding portions of the wefts is more than 10 mm, the protruding portions tend to be bent in a longitudinal direction of the threaded member. The protruded portions of the wefts which are bent in a longitudinal direction of the threaded member do not function as reinforcing filaments, as well as are do not contribute to entanglement thereof for reinforcement of the threaded portion.

As the thermohardened resin to be used in the present invention, there may be mentioned epoxy resins, unsaturated polyester resins, vinyl ester resins, epoxy acrylate resins, phenolic resins and the like. Preferred are epoxy resins from the standpoint of various desired properties such as bonding strength, tensile strength, bending strength, electrical insulating property, and a property of shrinkage-free in curing. The resin may contain an additive such as a curing agent, curing accelerator, etc. As examples of the curing agent, there may be mentioned methyltetrahydrophthalic anhydride, hexahydrophthalic anhydride, phthalic anhydride, tetrahydrophthalic anhydride, methoxyhexahydrophthalic anhydride and the like. When epoxy resins are employed, there may also be employed as a curing agent aliphatic polyamines such as tetraethylene pentamine and tetraethylene tetraamine, aromatic polyamines and the like.

As examples of the curing accelarator, there may be mentioned imidazole compounds such as 1-benzyl-2-methyl imidazole and 2-ethyl-4-methyl imidazole. There may also be used as the curing accelerator 2,4,6-tris(dimethyl aminomethyl)phenol, tetradecyldimethylbenzyl ammonium chloride and the like.

The woven fabric and the thermohardened resin are present in each resin-impregnated yarn tape or each resin-impregnated yarn cloth slit tape at a volume ratio of 30/70 to 65/35, preferably 45/55 to 65/35. If the volume ratio is less than 30/70, a resin-rich portion is formed in the externally threaded member and, therefore, crack of the externally threaded member tends to occur. If the volume ratio is more than 65/35, it is difficult to introduce resin-impregnated yarn tapes or resin-impregnated yarn cloth slit tapes into a mold.

In another aspect of the present invention, there is provided a method of producing an externally threaded member comprising a shank and a thread formed integrally therewith on the exterior surface of said shank, which comprises:

impregnating with a thermohardening resin a plurality of yarn tapes or yarn cloth slit tapes each made of an elongated woven fabric, the elongated woven fabric comprising a plurality of first strands arranged substantially in parallel and a plurality of second strands arranged substantially in parallel and substantially in perpendicular relation to the first strands, the first strands and second strands respectively constituting the warps and the wefts of the woven fabric, each strand comprising a plurality of fiber filaments, the elongated woven fabric having a width, as measured between the warps respectively disposed at both outward ends of the widthwise length of the fabric, about 0.2 to about 3 times the maximum diameter of the threaded member, thereby to obtain resin-impregnated yarn tapes or resin-impregnated yarn cloth slit tapes, drawing the resin-impregnated yarn tapes or resin-impregnated yarn cloth slit tapes, in longitudinal directions thereof, into the hollow portion of an elongate hollow mold having at one end thereof an inlet and at the other end thereof an outlet, said hollow portion extending throughout the length of the mold from the inlet to the outlet and having a circular or polygonal cross-section, while heating the mold, thereby to fill the hollow portion of the mold with said resin-impregnated tapes, Curing the resin of the resin-impregnated tapes in the hollow portion of said mold to form a rod comprising the tapes and the thermohardened resin and having a shape in cross-section corresponding to the shape of the cross-section of said hollow portion, removing the rod from said mold, and threading the peripheral surface of said rod.

Figure 4:
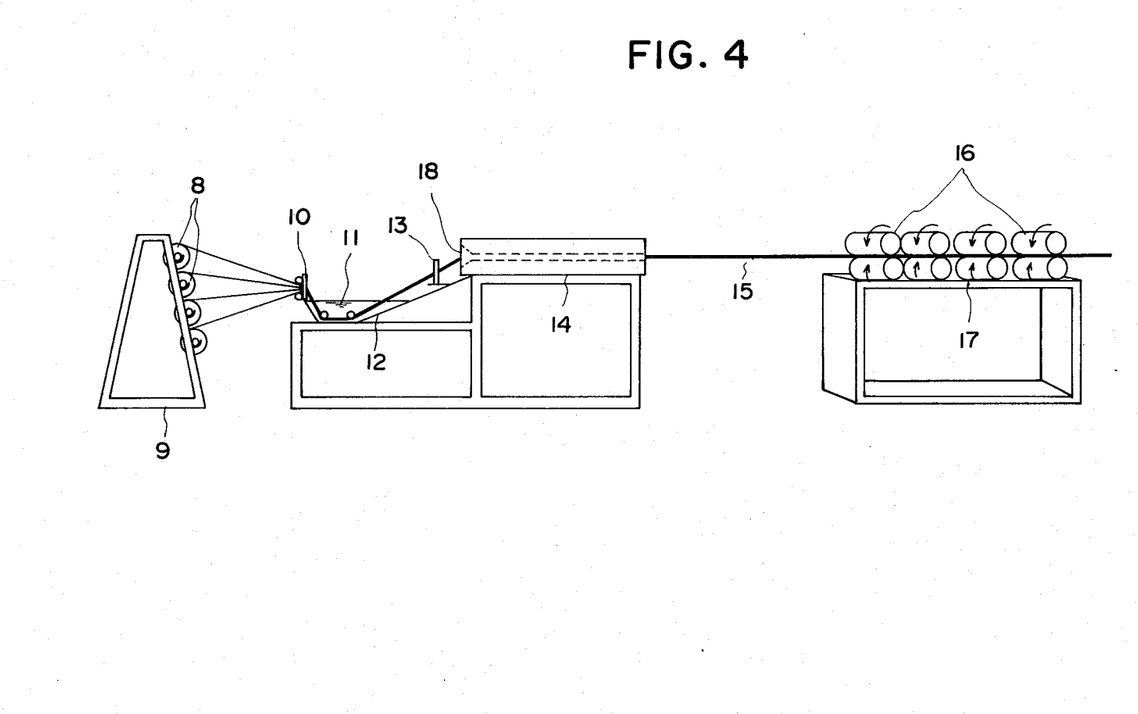
FIG. 4 is a diagrammatic illustration of one form of the apparatus for producing a fiber-reinforced plastic rod which will be processed into an externally threaded member of the present invention.

Referring now to FIG. 4, there is shown a diagrammatic illustration of one form of the apparatus for producing a fiber-reinforced rod which will be processed into an externally threaded member of the present invention. A plurality of yarn tapes or yarn cloth slit tapes 8 which are coiled and installed in a creel 9 are drawn out and introduced into a resin bath 12 through a comb-like guide 10. The tapes are dipped in a liquid thermohardening resin 11 in the resin bath 12 to obtain resin-impregnated yarn tapes or resin-impregnated yarn cloth slit tapes (either of the two kinds of tapes will hereinafter be often referred to simply as "resin-impregnated tape"). When the use of yarn cloth slit tapes is intended, the yarn cloth slit tapes are prepared by cutting a yarn cloth into slit tapes by means of a slitter equipped with a disk-shaped carbide cutter or a slitter equipped with laser beam radiator. The viscosity of the resin may be in the range of 0.1 to 15 poises, preferably 1 to 5 poises. The thus obtained resin-impregnated tapes are drawn, through another comb-like guide 13, into an elongated hollow mold 14 at its hollow portion, while heating the mold. The elongated hollow mold has at one end thereof an inlet and at the other end thereof an outlet. The hollow portion extends throughout the length of the mold from the inlet to the outlet and has a circular or polygonal cross-section. Thus, the hollow portion of the mold is filled with the resin-impregnated tapes.

The cross-section of the hollow portion of the mold may have a shape of a circle or a polygon. In the case of a polygonal shape, it is preferred that the shape be quadrilateral, pentagonal, hexagonal or higher-order polygonal.

The arrangement of the resin-impregnated tapes prior to drawing into the mold is not critical, provided that the resin-impregnated tapes are drawn in longitudinal directions thereof into the mold. The most common arrangement is to lay a plurality of the resin-impregnated tapes one upon another. There may preferably be adopted such an arrangement that the resin-impregnated tapes are divided into four groups of equal amounts and the four groups of tapes are arranged such that two pairs of the groups each are opposite to each other to form a quadrilateral. When the resin-impregnated tapes with such an arrangement are drawn into the mold, the externally threaded member obtained from them is improved with respect to the surface condition and the torque strength thereof.

As described before, it is preferred that the woven fabric and the thermohardened resin be present in each of the resin-impregnated tapes constituting the externally threaded member at a volume ratio of 30/70 to 65/35. To attain such a volume ratio of the woven fabric and the thermohardened resin in the externally threaded member, there may be employed a method in which the weight ratio of unimpregnated tapes to be used to a desired rod having a predetermined diameter and a predetermined length is controlled so that the threaded member has the above-mentioned volume ratio. The relationships between the weight ratio and the volume ratio will be given later.

The number of resin-impregnated tapes to be used for producing a rod is not critical, and may be widely varied depending on the width and density of the woven fabric constituting each of the unimpregnated tapes and the diameter of the desired rod. In general, the number of resin-impregnated tapes may be about 20 to about 200.

As mentioned before, the unimpregnated tapes each have a width, as measured between the warps respectively disposed at both outward ends of the widthwise length of the elongate woven fabric constituting the tape, about 0.2 to about 3 times the maximum diameter of the desired threaded member. The density of the elongated woven fabric constituting the unimpregnated tape may be about 20 to about 800 g/m². The fineness of each of the strands constituting the elongated woven fabric may be 2 to about 4000 Tex.

Referring back to FIG. 4, the excess amount of the resin in the resin-impregnated tapes is squeezed out prior to drawing the resin-impregnated tapes into the hollow portion of the mold. The squeezing may be effected at the inlet 18 or at any portion between the resin bath and the mold. When the squeezing is effected at the inlet of the mold, it is preferred that the inlet 18 of the mold have an inner wall tapered as shown in FIG. 4 so that the excess amount of the resin can be easily squeezed out. Simultaneously with the squeezing out of the excess amount of the resin, the bubbles contained in the resin-impregnated tapes may be purged.

The curing of the resin of the resin-impregnated tapes in the hollow portion of the mold is effected by heating the mold at about 100° to 180° C., preferably about 110° to 130° C. for about 5 minutes or more, preferably 10 to 12 minutes. The mold may be heated externally or internally. Upon curing of the resin, there is formed a rod comprising the tapes and the thermohardened resin and having a shape in cross-section corresponding to the shape of cross-section of said hollow portion.

The rod is released from the mold and then, subjected, on its peripheral surface, to threading by means of a die or a lathe.

According to one mode of the method of the present invention, the rod may be obtained in a batch-wise manner in which the above-mentioned procedures are repeated.

According to another more preferred mode of the method of the present invention, the curing of the resin of the resin-impregnated tapes may be effected during the travelling of the resin-impregnated tapes through the hollow portion of the mold, thereby enabling the rod to be obtained in the form of an elongated rod, continuously. In this case, the drawing of the resin-impregnated tapes into the hollow portion of the mold is continuously effected by pulling the rod out of the outlet of the hollow portion at a rate of 8 to 25 cm/minute, preferably 10 to 12 cm/minute by means of, for example, a pulling device 17 equipped with nip rolls 16 made of rubber as shown in FIG. 4. As examples of the pulling device of the kind other than that mentioned above, there may be mentioned a caterpiller type pulling device equipped with a pair of caterpillers adapted to hold the rod therebetween, a sandwich type pulling device equipped with two paris of nipping plates adapted to hold the rod therebetween, and a pulling device equipped with a pair of chucks adapted to hold the rod therebetween. As shown in FIG. 4, the pulling device 17 may be located apart from the mold 14, providing a cooling zone 15 therebetween.

The continuously obtained rod is cut into predetermined lengths. The continuously obtained rigid rod may be subjected, before or after cutting the rod into predetermined lengths, to post curing. The temperature and period of time of the post curing vary according the kinds of the thermogardening resin, curing agent and curing accelerator.

The rigid rod thus obtained is subjected, on its pripheral surface, to threading.

The above-mentioned method of continuously obtaining an elongated rod will be called a pultrusion method. In the pultrusion method, the length of the mold varies according to the thermohardening period for the resin used and to the pulling rate. From the practical viewpoint, the length of the mold may be in the range of about 1 to 2 m, preferably 1.2 to 1.8 m. On the other hand, in the above-mentioned batch-wise method the length of the mold varies according to the length of the desired externally threaded member. In both the methods, the mold may have an integral structure or may be a split die comprising die halves.

The externally threaded fiber-reinforced plastic member of the present invention, as is apparent from the above description, is reinforced with a plurality of first strands arranged substantially in parallel and extending longitudinally of the shank of the externally threaded member and a plurality of second strands arranged substantially in parallel and substantially in perpendicular relation to the first strands. The thread has therein portions of the second strands, most of the portions being those strand portions which extend continuously from and laterally of the shank into the thread and terminate within the thread. Therefore, the reinforcing effect of the second strands at the thread portion is considerably high, imparting high shear strength to the thread portion of the externally threaded member.

Further, the externally threaded fiber-reinforced plastic member of the present invention can be easily produced by subjecting a rod made of a plurality of resin-impregnated tapes to threading. The rod of the resin-impregnated tapes can be easily prepared by subjecting the resin-impregnated tapes to thermohardening in a mold without any pre-treatments such as pre-curing, piling-up, etc., leading not only to great reduction in manufacturing cost but also to high productivity.

Illustrative examples of the externally threaded member include bolts, screws and the like.

PREFERRED EMBODIMENTS

The present invention will be illustrated in more detail with reference to the following Example that should not be construed as limiting the scope of the invention.

In the meantime, the weight ratio of the woven fabric to the thermohardened resin in an externally threaded member can be measured by the following method. An externally threaded member is subjected to heat treatment to burn the thermohardened resin off. The heat treatment is effected at such a temperature condition that the thermohardened resin is burnt off but the woven fabrics are left as they are. After the thermohardened resin is burnt, the woven fabrics are weighed. The weight percentage of the woven fabric in the externally threaded member can be obtained by calculating the equation:

$$G_w = \frac{W_g}{W_I} \times 100 \, (\%)$$

$G_w$: weight percentage of woven fabric
$W_I$: weight of externally threaded member
$W_g$: weight of woven fabrics
the weight percentage of the thermohardened resin in the externally threaded member can be obtained by calculating the equation:

$$R_w = \frac{W_I - W_g}{W_I} \times 100 \, (\%)$$

$R_w$: weight percentage of thermohardened resin
$W_I$, $W_g$: as defined above

As stated before, according to the present invention, the woven fabric and the thermohardened resin are present in the externally threaded member at a volume ratio of 30/70 to 65/35. Meanwhile, the conversion of weight percent to volume percent can be made using the following equation:

$$G_v = \frac{100 \, \rho_r \cdot G_w}{100 \, \rho_g - G_w \, (\rho_g - \rho_r)}$$

$G_v$: volume percentage of woven fabric
$G_w$: weight percentage of woven fabric
$\rho_g$: specific gravity of woven fabric
$\rho_r$: specific gravity of thermohardened resin

EXAMPLE AND COMPARATIVE EXAMPLE

Glass fiber yarn cloths (manufactured and sold by Asahi-Schwebel Co., Ltd., Japan) were cut by means of an NS slitter (trade name of a slitter equipped with a carbide cutter manufactured by Nishimura Seisakusho, Japan) to obtain 50 yarn cloth slit tapes each having a width of 1.0 cm and a length of 200 m and having a density of 210 g/cm². The thus obtained tapes each were coiled and installed in a creel. The yarn cloth slit tapes were then drawn, through a comb-like guide, into a resin bath and dipped in a resin composition in the resin bath. The resin composition consisted of 50 parts by weight of AER 331 (trade name of an epoxy resin manufactured and sold by Asahi Kasei Kogyo K.K.), 50 parts by weight of D.E.R 438 (trade name of an epoxy resin manufactured and sold by the Dow Chemical Company, U.S.A.), 75 parts by weight of methyltetrahydrophthalic anhydride as a curing agent and 5 parts by weight of 2-ethyl-4-methyl-imidazole as a curing accelarator. The impregnation of the yarn cloth slit tapes with the resin composition in the resin bath was effected for 3 minutes to obtain resin-impregnated yarn cloth slit tapes. The thus obtained resin-impregnated yarn cloth slit tapes were taken out of the resin bath. Then, the resin-impregnated yarn cloth slit tapes were divided into 10 groups each of 5 resin-impregnated yarn cloth slit tapes and were passed at the same time by group through respective recessed portions of another comb-like guide. After passing through the recessed portions, the resin-impregnated yarn cloth slit tapes divided into ten groups were consolidated and arranged such that the resin-impregnated yarn cloth slit tapes were laid one upon another. The thus arranged resin-impregnated yarn cloth slit tapes were drawn into the hollow portion, having a circular cross-section, of a hollow mold which was heated at 130° C. by means of a pair of electric heating plates disposed to hold the mold therebetween. Before the arranged resin-impregnated yarn cloth slit tapes entered the mold, the excess amount of the resin in the resin-impregnated yarn cloth slit tapes was squeezed out from the resin-impregnated yarn cloth slit tapes at the inlet of the mold. The employed mold was a split die comprising die halves. The diameter and length of the hollow portion were 12.5 mm and 1 m, respectively. The curing of the resin-impregnated tapes in the mold was effected during the travelling of the resin-impregnated yarn cloth slit tapes through the hollow portion of said mold, thereby to obtain an elongate rod continuously. The thus obtained rod was pulled out of the outlet of the mold at a rate of 12 cm/minute. The drawing of the resin-impregnated tapes into the mold and pulling out of the rod thus obtained were effected by means of a pulling device equipped with nip rolls made of rubber disposed to hold the rod therebetween. The pulling device was disposed at a distance of 2 m from the mold to form a cooling zone. The above-obtained elongate rod was cut into short rods each having a length of 15 cm. The thus cut rods were subjected to post curing at 120° C. for 3 hours and subsequently at 150° C. for 5 hours to obtain rigid rods (hereinafter referred to as "Rod A").

The thus obtained rigid rods were subjected, on their respective peripheral suufaces, to threading by means of a thread cutting die [M12 (size standard according to the Japanese Industrial Standards B 0205), pitch 1.75 mm] for an iron bolt, thereby to obtain M12 bolts. One of the thus obtained bolts was subjected to determination of the amounts of the woven fabric and the thermohardened resin in the bolt in the manner as described before. As a result, the amounts of the woven fabric and the thermohardened resin based on the total amount of the bolt were 65% by weight and 35% by weight, respectively.

For the purpose of comparison, M12 bolts (pitch: 1.75 mm) having a length of 15 cm were produced from a round rod which was prepared by the prepreg-press method (manufactured and sold by Shinmei Raito Kogyo K.K., Japan)(hereinafter referred to as "Rod B") using the same thread cutting die as mentioned above.

Figure 5:
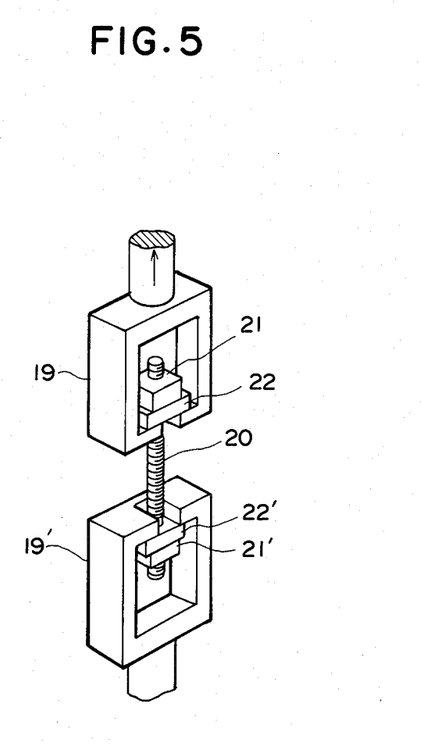
FIG. 5 is a diagrammatic illustration of a device for measuring the tensile strength of an externally threaded member.

With respect to five bolts of each of the above-mentioned kinds, tensile strength was determined using a device shown in FIG. 5 as follows. A load cell (not shown) is provided above an upper jig 19. The upper jig 19 and a lower jig 19' are pulled in opposite directions so that pulling force is applied to the bolt 20 and to nuts 21 and 21' (same nuts) through spacers 22 and 22'. The pulling force is increased until the thread of the bolt is sheared or the shank of the bolt is broken. A load at which the breaking of the thread or shank of the bolt occurs is measured by means of the load cell.

The nuts used for determining the tensile strength of the bolts were prepared as follows.

24 Glass fiber filament strands having a fineness of 2009 Tex (No. 1062-15, manufactured and sold by PPG Industries, Inc., U.S.A.) were drawn into a resin bath containing 100 parts by weight of AER 354 (trade name of an epoxy resin manufactured and sold by Asahi Kasei Kogyo K.K., Japan), 75 parts by weight of HN 2200 (trade name of methyltetrahydrophthalic anhydride manufactured and sold by Hitachai Chemical Co., Ltd., Japan) as a curing agent and 2 parts by weight of ATC-3 (trade name of N-(4'-methoxybenzylidene)-4-alkylaniline of which the alkyl moiety has 4 to 7 carbon atoms manufactured and sold by ICI Japan Ltd., Japan) as a curing accelerator, whereby the strands were impregnated with the resin. Each of the strands was withdrawn from the bath and passed through a carbide die having a diameter of 1.26 mm, whereby the amount of the resin carried by the strand was adjusted to 23±1% by weight based on the total weight of the resin and the strand. Then, the strands were combined into a band having a width of 6.4 cm through a comb-like guide and a semicircular guide located on a traverse carriage, and the band was uniformly wound in two different directions around a rotating cylindrical mandrel having a diameter of 92 cm and a length of 180 cm at a helix angle of 85°, thereby forming a layer of the resin-impregnated strands on the surface of the mandrel. The layer of the strands was then cut along the longitudinal axis of the mandrel to obtain a fiber reinforced resin sheet composed of two kinds of bands differing in the direction of winding form each other. The thus-obtained sheet was allowed to stand at 40° C. for 8 hours so that the state of the resin included in the sheet was changed to B-stage. The sheet is then cut into a plurality of sections (30 cm×30 cm). Three sections were taken out and then piled up in a mold heated to 125° C. and having a cavity of 30 cm in length, 30 cm in width and 5 cm in depth in such a manner that the two kinds of bands differing in the direction of winding of the section disposed in the middle were respectively oriented perpendicularly to the respective corresponding bands of the other two sections, followed by press-molding under a pressure of 50 Kg/cm² for one hour. As a result, there was obtained a composite sheet. The thicknesses of the above-obtained sheet was 16.0 mm. Two square-shaped pieces (22 mm×22 mm) were cut out from the above-obtained composite sheet, and both the pieces were subjected to boring by means of a drill, thereby forming a central bore extending in an axial direction thereof. The inner surface of the bore formed in each piece was subjected to threading by means of a tap, so that a thread adapted to receive a thread of M12 bolt (pitch: 1.75 mm) was formed thereon. As a result, two nuts were obtained. With respect to the production of nuts, reference may be made to the co-pending patent application entitled "an internally threaded fiber-reinforced plastic member and a method of producing the same" filed on the same date.

The results of the test are shown in Table.

TABLE

|  |  | Sample No. | Tensile strength (ton) | Broken portion |
|---|---|---|---|---|
| Present Invention | Bolts prepared from Rod A | 1 | 1.98 | thread of bolt |
|  |  | 2 | 1.98 | " |
|  |  | 3 | 2.25 | " |
|  |  | 4 | 2.00 | " |
|  |  | 5 | 2.15 | " |
|  |  | average | 2.07 | — |
| Comparative | Bolts prepared from Rod B | 1 | 2.17 | shank of bolt |
|  |  | 2 | 2.22 | " |
|  |  | 3 | 2.19 | thread of bolt |
|  |  | 4 | 2.19 | shank of bolt |
|  |  | 5 | 2.10 | " |
|  |  | average | 2.17 | — |

As is apparent from the foregoing, according to the present invention, an externally threaded member having a physical strength sufficient for practical use can be easily produced by subjecting a rod made of a plurality of resin-impregnated tapes to threading. Therefore, the externally threaded member of the present invention can be produced at low cost as compared with a conventional prepreg-press method which needs not only a step of preparing prepreg sheets but also a step of piling of a plurality of the prepreg sheets.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. An externally threaded, fiber-reinforced plastic member comprising a shank having a thread integrally formed on the exterior surface of said shank, said shank and said thread each comprising a plurality of resin-impregnated yarn tapes or resin-impregnated yarn cloth slit tapes extending longitudinally of the shank, each of at least some of said tapes being cut out at its portions corresponding to spaces defined by the ridges of said thread, said yarn tapes being fabrics of yarn woven in the form of tapes, and said yarn cloth slit tapes being tapes prepared by cutting a fabric of yarn woven in the form of a cloth into a plurality of tapes, each resin-impregnated yarn tape or each resin-impregnated yarn cloth slit tape being composed of a thermo-hardened resin and an elongated woven fabric comprising a plurality of first strands arranged substantially in parallel and extending longitudinally of said shank and a plurality of said second strands arranged substantially in parallel and substantially in perpendicular relation to said first strands, said first strands and second strands respectively constituting the warps and the wefts of said woven fabric, each strand comprising a plurality of fiber filaments, said elongated woven fabric having a width, as measured between the warps respectively disposed at both outward ends of the widthwise length of the fabric, about 0.2 to about 3 times the maximum diameter of the threaded member, said thread having therewithin portions of the second strands, most of said portions being those strand portions which extend continuously from the shank into the thread and terminate within the thread, said strand portions which extend continuously from said shank into said thread and terminate within said thread existing continuously or discontinuously within said thread along the periphery of said thread corresponding to one pitch of the thread, provided that there is no portion within said thread in which said strand portion do not exist continuously over a length of 20% or more based on the peripheral length of said thread corresponding to one pitch of the thread.

2. An externally threaded, fiber-reinforced plastic member according to claim 1, wherein the volume ratio of said woven fabric to said thermohardened resin in each resin-impregnated yarn tape or each resin-impregnated yarn cloth slit tape is 30/70 to 65/35.

3. An externally threaded, fiber-reinforced plastic member according to claim 1, wherein said resin is selected from at least one member of the group consisting of epoxy resins, unsaturated polyester resins, epoxy acrylate resins and phenolic resins.

4. An externally threaded fiber-reinforced plastic member according to claim 1, wherein said fiber filaments each have a tensile strength of 100 to 550 Kg/mm$^2$ and a modulus in tension of 6000 to 120000 Kg/mm$^2$.

5. An externally threaded, fiber-reinforced plastic member according to claim 4, wherein said fiber filaments are selected from at least one member of the group consisting of glass fiber filaments, aramid fiber filaments, carbon fiber filaments, boron fiber filaments and silicon carbide fiber filaments.

6. An externally threaded, fiber-reinforced plastic member according to claim 1, wherein said wefts of the elongated woven fabric protrude, at least at one side edge portion of said fabric, laterally of the outermost warp by a length of about 1 to 10 mm.

* * * * *